Sept. 19, 1967 T. J. NELSON ETAL 3,342,539

DIGITALLY RESPONSIVE PATTERN RECOGNITION SYSTEMS

Filed Dec. 24, 1963 3 Sheets-Sheet 1

FIG. I

INVENTORS T. J. NELSON
H.E.D. SCOVIL

BY Roy M. Porter Jr.

ATTORNEY

DIGITALLY RESPONSIVE PATTERN RECOGNITION SYSTEMS

Filed Dec. 24, 1963

United States Patent Office 3,342,539

Patented Sept. 19, 1967

3,342,539

DIGITALLY RESPONSIVE PATTERN RECOGNITION SYSTEMS

Terence J. Nelson, Ames, Iowa, and Henry E. D. Scovil, New Vernon, N.J., assignors to Bell Telephone Laboratories, Incorporated, New York, N.Y., a corporation of New York Filed Dec. 24, 1963, Ser. No. 333,028

3 Claims. (Cl. 350—150)

ABSTRACT OF THE DISCLOSURE

In a digital light-deflecting apparatus, the deflected light beam can carry a pattern of light variation imposed on its cross-section by a plurality of patterns positioned in the object plane preceding the deflection apparatus. A particular pattern is passed through an aperture in a mask to the output, the particular pattern being selected by the combination of digital deflecting signals applied to the cascaded digital deflection stages. The plurality of patterns is tilted away from the normal with respect to the direction of the beam in order to provide, in co-operation with a converging lens, the same magnification of every one of the patterns at the image plane whenever it is deflected toward the aperture. Such an apparatus may be used for pattern comparison or for high-speed data readout from digital computers, as illustrated.

This invention relates to systems utilizing a beam of radiant energy to project patterns and, more particularly to pattern comparison systems and high speed read-out systems for digital computers.

In the copending application of the applicant Nelson, Ser. No. 239,948, filed Nov. 26, 1962, which is incorporated by reference herein, it is taught that a beam of electromagnetic wave energy can be deflected to a matrix of different output positions in an inherently digital manner.

According to the present invention, applicants have recognized that a beam of electromagnetic wave energy that is deflected in a digital manner can carry one of several complete patterns positioned in the object plane preceding the deflection apparatus to an exact output position in an image plane following the deflection apparatus.

A mask having an aperture of dimensions adequate to admit just one of the projected patterns is placed in the image plane. Binary signals applied to the deflection apparatus determine the amount of deflection of the beam and thereby select which of the several patterns will be projected toward the aperture.

According to a feature of the invention, the object plane is tilted away from the perpendicular with respect to the direction of the beam in order to provide, in co-operation with a converging lens, a fixed magnification of each pattern at the image plane whenever it is deflected toward the aperture. The tilt displaces the patterns relatively in the direction of the beam by amounts directly related to the respective amounts of deflection required to direct the patterns toward the aperture.

Such an apparatus may be used for pattern comparison or for high-speed data read-out from digital computers. For either purpose, it is characteristic of the invention that all parts of a complex pattern are formed simultaneously, yet the apparatus may obtain rapid access to any desired pattern in any desired sequence without searching through other patterns.

In a pattern comparison apparatus according to the present invention, a photographic pattern of unascertained identity or content is placed in line with the aperture at the output of the deflection apparatus. If the pattern projected from the input toward the aperture and the pattern positioned in line with the aperture are related to each other as positive-to-negative and are similarly oriented and centered with respect to the aperture, a minimal amount of radiant energy can pass the latter pattern. A photomultiplier may be positioned to detect the amount of radiation that is passed.

Especially advantageous is the fact that the pattern at the output can be tested against each of the patterns at the input in very rapid succession. In particular, the input patterns can include many repetitions of the same geometrical shapes in many differing orientations and displacements.

The speed with which a beam of electromagnetic wave energy may be deflected also enables the rapid transfer of computational results from a digital computer onto permanent records. One of the most frustrating current problems in computer technology is the machine working time that is lost while the computational results are read from its memory onto a suitable permanent record. Buffer machines and magnetic drums have heretofore been used for this purpose.

In data read-out apparatus according to the present invention, a plurality of patterns in the object plane preceding a digital beam deflection apparatus represent different numbers or other results of computer logic operations. The binary output signals typically produced by the digital computer are applied directly to the deflection apparatus and deflect the beam that bears the various patterns to select a particular pattern for projection toward a fixed aperture in a mask in the image plane at the output of the deflection apparatus. A strip of unexposed photographic film is run at constant speed past the aperture on the side of the mask opposite the source of the light beam. A solid state electronic light shutter controls the exposure of the film.

The film that is thus exposed may be developed and stored without further processing, or may be transferred to punched cards in other machines. In either event, digital computer working time is not lost during the further processing of the output information.

Further features and advantages of the invention will become apparent from the following detailed description and the drawing, in which.

Figure 1:
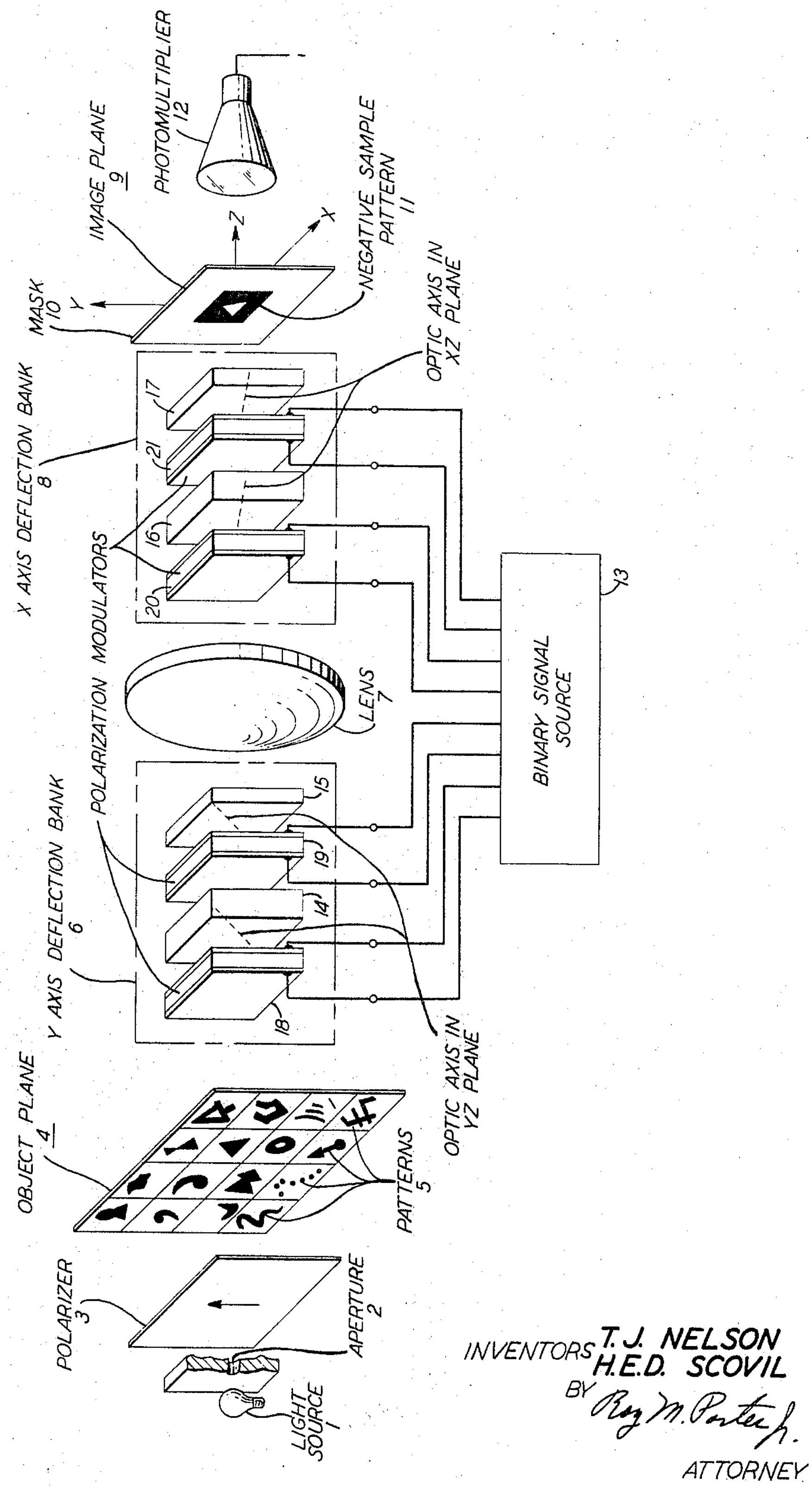
FIG. 1 is a partially pictorial and partially block diagrammatic showing of a preferred embodiment of the invention as applied for comparing a pattern with a plurality of other patterns in rapid succession.

In FIG. 1, the frequency of light source 1 and the diameter of aperture 2 are proportioned so that a light beam diverges from aperture 2 to illuminate all of the patterns 5 in the object plane 4. Polarizer 3 is a polarizing filter such as a Polaroid filter that transmits light of a single plane polarization and blocks light of all other polarizations so that all rays of the beam may be deflected in the same manner by the Y-axis deflection bank 6 and X-axis deflection bank 8. Each of the patterns 5 preferably includes only substantially opaque and substantially transparent portions, and may comprise photographic film that has been appropriately exposed and developed.

In the Y-axis deflection bank 6, the optic axis of negative uniaxial birefringement crystals 14 and 15, which may be calcite crystals, lie in the Y—Z plane or in planes parallel to the Y—Z plane and obliquely intersect rays from the preceding modulator 18 and 19, respectively. In X-axis deflection bank 8, the optic axes of the negative uniaxial crystals 16 and 17, likewise calcite crystals, lie in the X—Z plane, or in planes parallel to the X—Z plane and obliquely intersect rays from the preceding modulator 20 and 21, respectively.

Whenever the rays incident upon a crystal are polarized in the plane of its optic axis, the rays are deflected. When they are polarized in a plane perpendicular to the optic axis, they are not deflected.

Modulators 18 through 21 may, for example, contain crystals of potassium dihydrogen phosphate (KDP) having optic axes induced by signals from source 13, the induced axes lying at 45 degree angles with respect to the plane of the polarization of polarizer 3. Other examples of modulators are described in the above-cited application of the applicant Nelson. Each polarization modulator, in response to the binary signal applied to it by source 13, either zero volts or about seven kilovolts, the quarter-wave voltage for KDP, produces one or the other of the above-described polarizations of the rays. Source 13 is basically a pulse generator designed to produce in sequence all possible combinations and permutations of voltages between its output terminal pairs connected to the respective modulators. Each combination or permutation of the binary voltage signals applied to the modulators 18 through 21, from a source 13 will together determine which calcite crystals produce deflections and, therefore, which of the patterns 5 will be projected toward negative sample pattern 11, which may comprise appropriately exposed and developed photographic film. Pattern 11 is mounted in the aperture of mask 10, which is a sheet of material opaque to light from source 1. Mask 10 and pattern 11 may be said to lie in the image plane 9.

As an example for the arrangement of deflection banks 6 and 8 as shown in FIG. 1, assume that the pattern 5 in the upper right-hand corner of the object plane 4 will be superimposed on negative sample pattern 11 whenever the beam is not deflected. If rays of light transmitted by transparent portions of the projected pattern 5 strike opaque portions of the sample pattern 11, then all rays of the beam are blocked from photomultiplier 12. However, for the arrangement of patterns 5 shown in FIG. 1, the upper right-hand pattern 5 does not correspond in this fashion to negative sample pattern 11; and a substantial portion of the light rays will strike photomultiplier 12, a photosensitive light detecting device familiar in the optical art. The output level of photomultiplier 12 will tend to indicate the degree in which the two superimposed patterns do not correspond in positive-to-negative relationship.

Since completely opaque portions of pattern 11 must block rays passing through substantially transparent portions of the projected pattern 5 before photomultiplier 12 will indicate coincidence, the invention tests the relative size, orientation and lateral displacement of these two patterns, as well as their geometrical similarity. If it is desired to test pattern 11 only for the geometrical similarity to one of the patterns 5, there may be provided among patterns 5 in object plane 4 a large number of repetitions of the same geometrical shape in different sizes, orientations and lateral displacements. A large number of such patterns is permissible because $n$ binary deflection units in deflection banks 6 and 8, taken together, permit $2^n$ different patterns.

If there are eight binary deflection units in deflection bank 6 and another eight binary deflection units in deflection bank 8, then the surprising total of 65,536 patterns 4 may be used in object plane 4, that is, 256 patterns on a side.

Since deflection banks 6 and 8 permit switching between any two of these patterns 5 in a few nanoseconds (one nanosecond=one billionth of a second, pattern 11 can be compared with all 65,536 of the patterns 5 as fast as photomultiplier 12 will respond.

It should be noted that, by using the foregoing principles, it should be possible to use the invention for very rapid signature comparison. A large number of repetitions of each authorized signature would be used as the patterns 5.

From the preceding discussion, it may be seen that the outlines of the patterns 5 must be clearly defined. Improvement of the pattern definition is obtained from the lens 7, which is a convention convex optical or light-focusing lens familiar in the art. Lens 7 reconverges the diverging rays incident upon it. More generally, a lens such as lens 7 improves the optical resolution of the basic deflection apparatus disclosed in the above-cited application of the applicant Nelson. For a unity magnification ratio, the distance from the object plane 4 on the centerline of an undeflected beam to the center of the lens 7 and the distance from the center of the lens 7 to the image plane 9 on the centerline of the undeflected beam are both equal to twice the focal lengh of lens 7.

Characteristic of the interaction between lens 7 and deflection banks 6 and 8 is the fact that a deflected beam tends to form a unity magnification image closer to, or farther from, the lens 7 than does an undeflected beam. This effect is attributable to the different refractive indices encountered by deflected and undeflected rays, called extraordinary rays and ordinary rays, respectively, in the uniaxial crystals 14, 15, 16 and 17. Specifically, when crystals 14 through 17 are negative uniaxial crystals and the patterns 5 lie in a plane perpendicular to the direction of the beam, a unity magnification image tends to be formed closer to the lens 7 by a deflected beam than by an undeflected beam. In contrast, the undeflected beam forms the closest image when crystals 14 through 17 are positive uniaxial crystals. The relative displacement along the Z-axis, that is, in the direction of the beam, is $$\Delta Z = K_R \cot \psi (\Delta X + \Delta Y)$$

where $\psi$ is the angle between the outermost converging rays and the centerline of the undeflected beam, $\Delta X$ and $\Delta Y$ are the amounts of lateral deflection of the beam in the X-axis direction and in the Y-axis direction, respectively, and $K_R$ is a constant dependent upon the ordinary and extraordinary refractive indices of the uniaxial birefringent material in crystals 14 through 17. It can be shown that $$K_R = \left(\frac{1}{N_o N_e}\right)^2 \cdot \left(\frac{N_o^2 + N_e^2}{2}\right)^{3/2} - \frac{1}{N_o}$$

where $N_o$ is the refractive index of the birefringent material for a so-called ordinary ray, and $N_e$ is the refractive index of the birefringent material for a so-called extraordinary ray.

Figure 3:
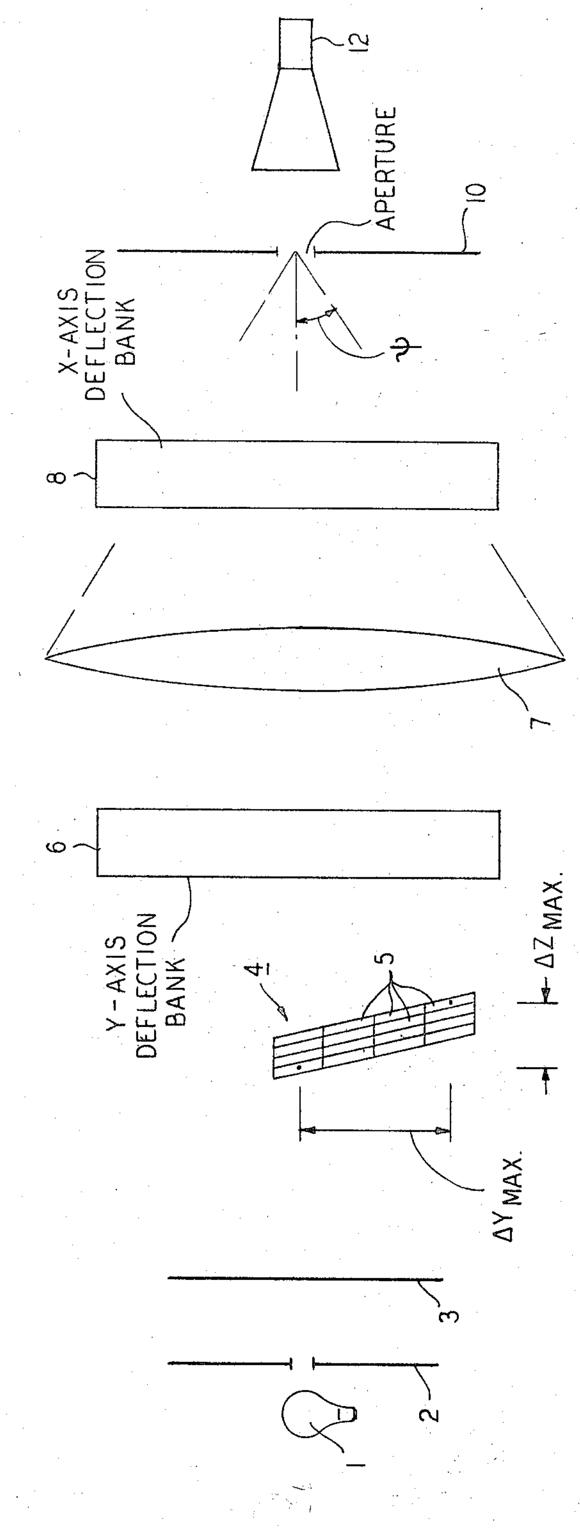
FIG. 3 is a simplified side view of the embodiment of FIG. 1 from which the principle of tilting the patterns can be explained.
Figure 3A:
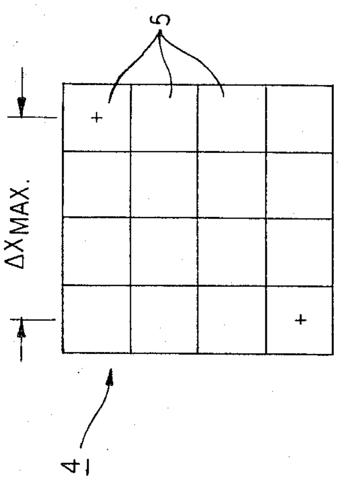
FIG. 3A is a view of the patterns of FIG. 1 along the Z-axis of the system.

Accordingly, applicants have recognized that in apparatus according to the present invention this focusing effect can be compensated by tilting the object plane 4 away from the perpendicular with respect to the direction of the beam, as shown in FIG. 3. In accordance with the principle that moving a pattern 5 toward lens 7 causes its image to recede from lens 7, the pattern 5 whose image must be deflected by the maximum amount, $$(\Delta X + \Delta Y)_{max.}$$

by negative uniaxial birefringent crystals 14 through 17 in order to arrive at the aperture in mask 10 is moved by the tilting to be $\Delta Z_{max.}$ closer to lens 7 than the pattern 5 that may be projected toward the aperture in mask 10 with no deflection at all. If the upper right-hand pattern of FIG. 1 is the selected one when the beam is not deflected, as assumed above, then the lower left-hand pattern is the one which must be deflected by both amounts $\Delta X_{max.}$ and $\Delta Y_{max.}$ to be the selected pattern, as indicated in FIGS. 3 and 3A. In FIG. 3, the upper left-hand pattern corresponds to the upper right-hand pattern of FIG. 1; and the lower right-hand pattern corresponds to the lower left-hand pattern of FIG. 1, since the straight side view of FIG. 3 shows the back side of the tilted patterns. The lower left-hand pattern of FIG. 1 is displaced by $\Delta Z_{max.}$ closer to lens 7 than the upper right-hand pattern of FIG. 1, where $\Delta Z_{max.}$ as shown in FIG. 3, is determined from the preceding equations. The tilting moves other patterns 5 to intermediate positions as determined by the foregoing equations. A unity magnification image of any pattern 5 in the entire object plane 4 may then be superimposed on tested pattern 11 by producing the appropriate horizontal and vertical deflections according to the teachings of the above-cited application of the applicant Nelson. The opposite tilting of the object plane 4 is appropriate when crystals 14 through 17 are positive uniaxial crystals.

Whenever a lens 7 focuses a beam that is deflected from a single position in the object plane 4 to a plurality of positions in the image plane 9, or output matrix, as in the above-cited application of the applicant Nelson, the image plane 9, instead of the object plane, should be tilted with respect to the direction of the beam in order to compensate for the above-described focusing effect. The tilt provides that the image plane 9 will intercept spots or images of like magnification.

It should be noted that the diameter of lens 7 should be large enough to collect substantially all of the diverging rays passing through the patterns 5. In a practical situation, the collection of rays from the object plane 4 will be limited by the maximum usuable acceptance angles of the negative-uniaxial crystals 14 through 17 and the solid state light switches 18 through 21. A good practical compromise for the angle of dirvergence of the light rays is $3/\pi$ degrees, which requires a lens "F-number" of 15 for lens 7. The "F-number" of the lens 7 is the ratio of its focal length to its diameter.

Figure 2:
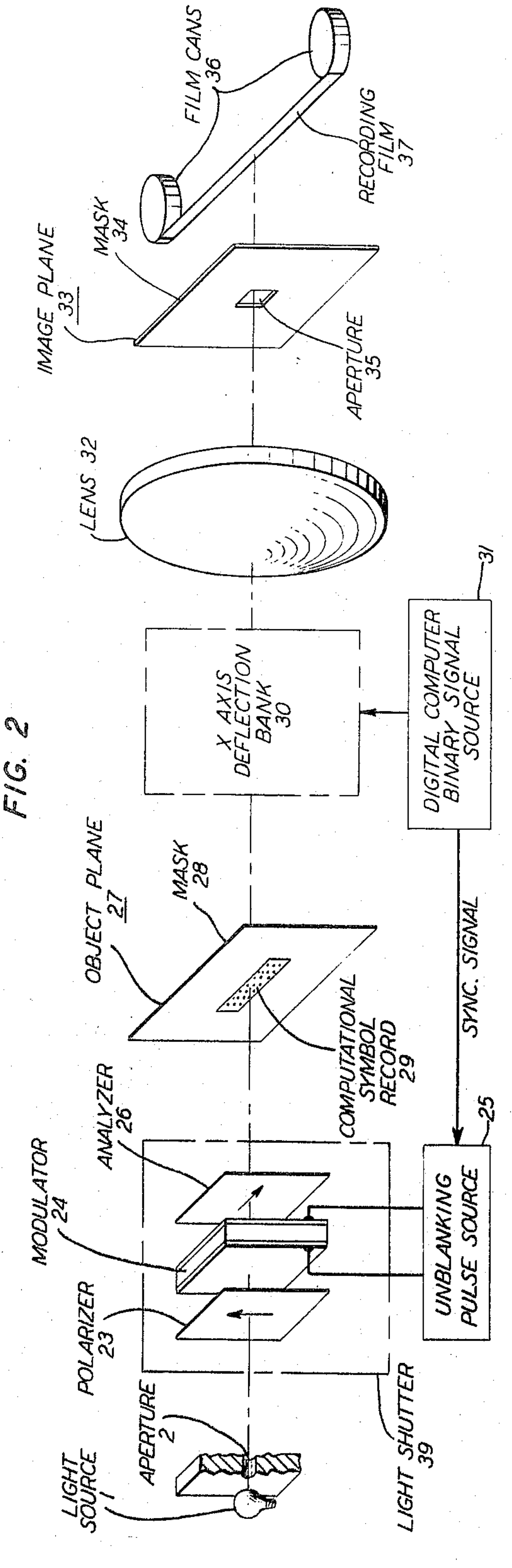
FIG. 2 is a partially pictorial and partially block diagrammatic of another preferred embodiment of the invention as applied for rapidly transferring the output information from a digital computer onto permanent records.

In the embodiment of FIG. 2, the inherently great speed with which the invention can switch from one projected pattern to another is used to facilitate the removal of the computational or logical results from a digital computer 31 onto permanent records, such as film 37. These records can then be studied by the operators at leisure while the computer 31 continues with further work.

Results appear at the output of the computer 31 as groups of related binary signals commonly called "words" of binary information. The binary signals individually are typically voltages or currents each having one of two different magnitudes or polarities. These signals are applied to various polarization modulators of deflection apparatus 30, which is like X-axis deflection bank 8 of FIG. 1.

The ribbon-like beam of polarized light passing through the computational symbol record 29 in mask 28 is deflected to the left or right by deflection bank 30 in response to a group of the binary signals from source 31 to form an image of one of its numbers, or of a symbol representing the results of a logic operation, in the aperture 35 of mask 34 in image plane 33. Immediately behind aperture 35, the image is recorded on the photographic film 37, which is running at a high constant speed. Masks 28 and 34 comprise material that is opaque to light from source 1.

In order to avoid smearing the image on film 37, a photographic shutter 39 passes a pulse of light from source 1 that lasts just long enough to expose film 37 adequately to the projected computational symbol. Photographic shutter 39 comprises the polarizer 23, the crossed analyzer 26, which may be material like polarizer 3 of FIG. 1, the polarization modulator 24, which may be like modulators 18 through 21 in FIG. 1, and the unblanking voltage pulse source 25. Whenever digital computer 31 applies a group of related binary signals to deflection bank 30, it simultaneously applies a synchronizing signal to unblanking pulse source 25. In response to the synchronizing signal, source 25 generates a voltage pulse and applies it to modulator 24, which in turn modulates the polarization of the light passing through it. At least part of the polarization-modulated light will pass through analyzer 26.

Figure 2A:
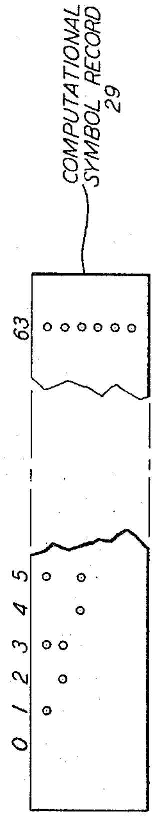
FIG. 2A is an enlarged view of the computational symbol record employed in FIG. 2.

A closer view of computational symbol record 29 is given in FIG. 2A. Record 29 may be a photographic film or plate that has been appropriately exposed and developed and mounted in the aperture of mask 28. For convenience, it may be assumed that the output of the computing machine 31 is available as sexadecimal numbers, that is, binary numbers from zero to sixty-three. Therefore, only a horizontal deflection bank is required because the number of patterns is rather small. The patterns comprise transparent or opaque spots on the opposite type of background. The patterns might also comprise holes in an opaque medium. Each vertically arranged group of spots or holes represents one possible group of the binary signals produced by digital computer 31, that is, one of the sexadecimal numbers. In response to each group of binary signals applied to deflection bank 30, the beam is deflected by a different amount, and the image of a corresponding group of spots is formed on film 37.

It should be obvious that the common arabic number symbols, 1, 2 . . . 63, could be used as well, although lens 32 is then required to provide greater resolution than is required by the spot grouping technique. Other obvious modifications include the use of a much larger range of binary numbers by digital computer source 31. In that event, it may be desirable to use a vertical, or Y-axis, deflection bank, like bank 6 of FIG. 1, as well as X-axis deflection bank 30. The symbols in computational symbol record 29 would then appear in a rectangular arrangement in the aperture of mask 28. That is, some groups of spots would appear above or below other groups, as well as to the side of still other groups, in the fashion of patterns 5 of FIG. 1.

The computational symbol record 29 should form a plane that is tilted with respect to the direction of the beam, just as explained above for the embodiment of FIG. 1. The use and positioning of lens 32 in FIG. 2 is substantially similar to that of lens 7 of FIG. 1. It should be pointed out, nevertheless, that applicants have no preference for unity magnification in this embodiment of the invention; higher magnification and demagnification could as well be used.

A moderate estimate of the speed of read-out apparatus according to the present invention may be obtained as follows. Assume that the film 37 can be driven at the speed of 100 inches per second, as is practical for motion picture film. If the linearly arranged spot patterns on computational symbol record 29 are separated by 2.5 mils (0.0025 inch), then 400 such patterns or number symbols per inch on film 37 are possible. Consequently, 40,000 such number symbols per second can be accepted from digital computer 31 and permanently recorded. This speed of recording can be increased if the resolution of film 20 or its traversal speed can be increased. The deflection speed of bank 30 is so great as to have no substantial effect on recording speed.

In all cases, the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. In a light-deflecting apparatus of the type including a source of divergent plane polarized light and a plurality of aligned cascaded beam-deflecting stages, each having in the order of the incoming beam of light means for rotating the plane of polarization of the beam of light transmitted into one of two mutually orthogonal planes and birefringent means for transmitting the beam of light along one of two different paths dependent on the plane of polarization of the light, the combination comprising a plurality of partially transmissive substantially planar patterns arranged to be illuminated by said divergent light between said source and said plurality of stages, output means having a fixed aperture proportioned to admit light from only one of said patterns, means for applying signals to said rotating means in said plurality of stages to select the light transmitted through one of said patterns to be transmitted through said aperture, and a converging lens disposed between the plurality of patterns and the output means to focus light from said patterns onto said output means, said combination being characterized in that the plurality of partially transmissive patterns form an array in a common plane that is tilted with respect to the normal to the direction of the beam in a sense and by an amount that provides substantially the same magnification of every one of said patterns whenever said one pattern is deflected to pass through said aperture.

2. In a light-deflecting apparatus of the type of claim 1, the combination of claim 1 particularly characterized in that the plurality of partially transmissive patterns form an array in a common plane that is tilted with respect to the normal to the direction of the beam by an amount that moves a pattern from which light need be deflected by $\Delta X$ and $\Delta Y$ for selection to be nearer to or farther from the lens than the pattern from which light need not be deflected for selection by the amount $$\Delta Z = K_R \cot \psi (\Delta X + \Delta Y)$$

where $K_R$ is a constant dependent upon the ordinary and extraordinary indices of refraction of the birefringent means and $\psi$ is the maximum angle of convergence provided by the lens with respect to the center line of the undeflected beam, and in the sense that said pattern needing light deflection is nearer to the lens when the birefringent means are of the type having negative birefringence and is farther from the lens when the birefringent means are of the type having positive birefringence.

3. In a light-deflecting apparatus of the type claimed in claim 2, the combination of claim 2 in which the array is tilted to move the pattern needing light deflection by the aforesaid amount $\Delta Z$ where $$K_R = \left(\frac{1}{N_o N_e}\right)^2 \cdot \left(\frac{N_o^2 + N_e^2}{2}\right)^{3/2} - \frac{1}{N_o}$$

where $N_o$ is the ordinary index of refraction of the birefringent means and $N_e$ is the extraordinary index of refraction of the birefringent means.

References Cited

UNITED STATES PATENTS

| | | | |
|---|---|---|---|
| 2,597,589 | 5/1952 | Matthias | 88—61 |
| 2,942,538 | 6/1960 | Bechtold | 88—10 |
| 3,072,889 | 1/1963 | Willcox | 340—173 |
| 3,118,129 | 1/1964 | Fitzmaurice | 88—14 |

JEWELL H. PEDERSEN, *Primary Examiner.*

R. J. STERN, *Assistant Examiner.*